United States Patent
Tierney (10) Patent No.: US 9,038,177 B1
(45) Date of Patent: May 19, 2015

(54) METHOD AND SYSTEM FOR IMPLEMENTING MULTI-LEVEL DATA FUSION

(75) Inventor: Sean M. Tierney, Fair Lawn, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 264 days.

(21) Appl. No.: 13/191,924

(22) Filed: Jul. 27, 2011

Related U.S. Application Data (60) Provisional application No. 61/418,020, filed on Nov. 30, 2010.

(51) Int. Cl.
*G06F 12/14* (2006.01)
*H04L 29/06* (2006.01)

(52) U.S. Cl.
CPC ...... *H04L 63/1408* (2013.01); *H04L 29/06891* (2013.01)

(58) Field of Classification Search
CPC ............ H04L 63/1408; H04L 63/1416; H04L 63/1425
See application file for complete search history.

(56) References Cited

U.S. PATENT DOCUMENTS

| | | |
|---|---|---|
| 3,872,448 A | 3/1975 | Mitchell, Jr. |
| 4,573,127 A | 2/1986 | Korf |
| 5,046,002 A | 9/1991 | Takashi et al. |
| 5,159,687 A | 10/1992 | Richburg |
| 5,168,444 A | 12/1992 | Cukor et al. |
| 5,202,986 A | 4/1993 | Nickel |
| 5,253,341 A | 10/1993 | Rozmanith et al. |
| 5,278,982 A | 1/1994 | Daniels et al. |
| 5,297,031 A | 3/1994 | Gutterman et al. |
| 5,313,616 A | 5/1994 | Cline et al. |
| 5,347,518 A | 9/1994 | Lee |
| 5,455,946 A | 10/1995 | Mohan et al. |
| 5,471,613 A | 11/1995 | Banning et al. |
| 5,471,629 A | 11/1995 | Risch |
| 5,600,836 A | 2/1997 | Alter |
| 5,627,886 A * | 5/1997 | Bowman ...................... 379/111 |
| 5,630,118 A | 5/1997 | Shaughnessy |
| 5,630,173 A | 5/1997 | Oprescu |
| 5,644,762 A | 7/1997 | Soeder |

(Continued)

FOREIGN PATENT DOCUMENTS

| | | |
|---|---|---|
| WO | WO 95/03586 | 2/1995 |
| WO | WO 96/34350 | 10/1996 |
| WO | WO 02/46980 | 6/2002 |

OTHER PUBLICATIONS 2.40 General—Reviews and Abstracts, SPI Database of Software Technologies, p. 1-5, Feb. 1, 1974.

(Continued)

*Primary Examiner* — Matthew Henning
(74) *Attorney, Agent, or Firm* — Hunton & Williams LLP (57) ABSTRACT

An embodiment of the present invention involves a computer implemented method and system for implementing data fusion comprising aggregating data from a plurality of sources via one or more computer networks, wherein the data comprises at least unstructured data; extracting one or more features from the aggregated data; enriching the extracted data by compiling the data into one or more categories; generating one or more datasets based on the enriched data for identifying potentially fraudulent activity; and identifying one or more proposed actions to address the potentially fraudulent activity using a graphical interface.

18 Claims, 3 Drawing Sheets

(56) References Cited

U.S. PATENT DOCUMENTS

| | | | |
|---|---|---|---|
| 5,668,989 A | 9/1997 | Mao | |
| 5,701,471 A | 12/1997 | Subramanyam | |
| 5,719,826 A | 2/1998 | Lips | |
| 5,737,735 A | 4/1998 | Soeder | |
| 5,740,442 A | 4/1998 | Cox et al. | |
| 5,748,878 A | 5/1998 | Rees et al. | |
| 5,752,034 A | 5/1998 | Srivastava | |
| 5,758,061 A | 5/1998 | Plum | |
| 5,758,336 A | 5/1998 | Brady | |
| 5,758,346 A | 5/1998 | Baird | |
| 5,761,668 A | 6/1998 | Adamchick | |
| 5,764,972 A | 6/1998 | Crouse et al. | |
| 5,765,145 A | 6/1998 | Masiello | |
| 5,765,155 A | 6/1998 | Nakamura | |
| 5,774,553 A | 6/1998 | Rosen | |
| 5,774,877 A | 6/1998 | Patterson, Jr. | |
| 5,784,557 A | 7/1998 | Oprescu | |
| 5,787,402 A | 7/1998 | Potter et al. | |
| 5,794,048 A | 8/1998 | Brady | |
| 5,797,117 A | 8/1998 | Gregovich | |
| 5,806,063 A | 9/1998 | Dickens | |
| 5,806,067 A | 9/1998 | Connor | |
| 5,808,889 A | 9/1998 | Burgess | |
| 5,809,500 A | 9/1998 | Nolan | |
| 5,812,849 A | 9/1998 | Nykiel et al. | |
| 5,828,883 A | 10/1998 | Hall | |
| 5,828,890 A | 10/1998 | Rehbock et al. | |
| 5,832,523 A | 11/1998 | Kanai et al. | |
| 5,835,770 A | 11/1998 | Shum et al. | |
| 5,835,909 A | 11/1998 | Alter | |
| 5,838,979 A | 11/1998 | Hart et al. | |
| 5,845,286 A | 12/1998 | Colizza | |
| 5,845,293 A | 12/1998 | Veghte et al. | |
| 5,852,824 A | 12/1998 | Brown | |
| 5,867,495 A * | 2/1999 | Elliott et al. | 370/352 |
| 5,872,976 A | 2/1999 | Yee et al. | |
| 5,878,422 A | 3/1999 | Roth et al. | |
| 5,897,633 A | 4/1999 | Nolan | |
| 5,903,895 A | 5/1999 | Hoffman et al. | |
| 5,907,846 A | 5/1999 | Berner et al. | |
| 5,915,116 A | 6/1999 | Hochman et al. | |
| 5,920,719 A | 7/1999 | Sutton et al. | |
| 5,926,814 A | 7/1999 | Fridman | |
| 5,930,506 A | 7/1999 | Bieler | |
| 5,930,782 A | 7/1999 | Shaughnessy | |
| 5,950,197 A | 9/1999 | Beam | |
| 5,978,477 A | 11/1999 | Hull et al. | |
| 6,009,405 A | 12/1999 | Leymann et al. | |
| 6,012,087 A | 1/2000 | Freivald et al. | |
| 6,014,671 A | 1/2000 | Castelli et al. | |
| 6,026,237 A | 2/2000 | Berry et al. | |
| 6,029,002 A | 2/2000 | Afifi et al. | |
| 6,029,175 A | 2/2000 | Chow et al. | |
| 6,058,393 A | 5/2000 | Meier et al. | |
| 6,065,009 A | 5/2000 | Leymann et al. | |
| 6,081,808 A | 6/2000 | Blackman et al. | |
| 6,108,698 A | 8/2000 | Tenev et al. | |
| 6,125,390 A | 9/2000 | Touboul | |
| 6,138,112 A | 10/2000 | Slutz | |
| 6,138,158 A | 10/2000 | Boyle et al. | |
| 6,145,121 A | 11/2000 | Levy et al. | |
| 6,163,776 A | 12/2000 | Periwal | |
| 6,167,534 A | 12/2000 | Straathof et al. | |
| 6,188,400 B1 | 2/2001 | House et al. | |
| 6,226,652 B1 | 5/2001 | Percival et al. | |
| 6,237,143 B1 | 5/2001 | Fontana et al. | |
| 6,243,862 B1 | 6/2001 | Lebow | |
| 6,256,635 B1 | 7/2001 | Arrouye et al. | |
| 6,263,121 B1 | 7/2001 | Melen et al. | |
| 6,266,683 B1 | 7/2001 | Yehuda et al. | |
| 6,269,479 B1 | 7/2001 | Puram | |
| 6,279,008 B1 | 8/2001 | Tung Ng et al. | |
| 6,301,701 B1 | 10/2001 | Walker et al. | |
| 6,311,320 B1 | 10/2001 | Jibbe | |
| 6,311,327 B1 | 10/2001 | O'Brien et al. | |
| 6,336,122 B1 | 1/2002 | Lee et al. | |
| 6,356,920 B1 | 3/2002 | Vandersluis | |
| 6,377,691 B1 | 4/2002 | Swift et al. | |
| 6,381,609 B1 | 4/2002 | Breitbart et al. | |
| 6,385,618 B1 | 5/2002 | Ng et al. | |
| 6,393,023 B1 | 5/2002 | Shimizu et al. | |
| 6,397,221 B1 | 5/2002 | Greef et al. | |
| 6,405,209 B2 | 6/2002 | Obendorf | |
| 6,411,957 B1 | 6/2002 | Dijkstra | |
| 6,418,446 B1 | 7/2002 | Lection et al. | |
| 6,418,448 B1 | 7/2002 | Sarkar | |
| 6,418,451 B1 | 7/2002 | Maimone | |
| 6,446,062 B1 | 9/2002 | Levine et al. | |
| 6,449,623 B1 | 9/2002 | Bohannon et al. | |
| 6,453,310 B1 | 9/2002 | Zander | |
| 6,456,995 B1 | 9/2002 | Salo et al. | |
| 6,467,052 B1 | 10/2002 | Kaler et al. | |
| 6,477,540 B1 | 11/2002 | Singh et al. | |
| 6,490,581 B1 | 12/2002 | Neshatfar et al. | |
| 6,502,095 B2 | 12/2002 | Breitbart et al. | |
| 6,502,104 B2 | 12/2002 | Fung et al. | |
| 6,532,467 B1 | 3/2003 | Brocklebank et al. | |
| 6,535,894 B1 | 3/2003 | Schmidt et al. | |
| 6,539,337 B1 | 3/2003 | Provan et al. | |
| 6,539,383 B2 | 3/2003 | Charlet et al. | |
| 6,539,397 B1 | 3/2003 | Doan et al. | |
| 6,539,398 B1 | 3/2003 | Hannan et al. | |
| 6,557,039 B1 | 4/2003 | Leong et al. | |
| 6,564,048 B1 | 5/2003 | Sugita | |
| 6,571,249 B1 | 5/2003 | Garrecht et al. | |
| 6,574,640 B1 | 6/2003 | Stahl | |
| 6,578,129 B1 | 6/2003 | Da Silva, Jr. et al. | |
| 6,591,260 B1 | 7/2003 | Schwarzhoff et al. | |
| 6,601,075 B1 | 7/2003 | Huang et al. | |
| 6,611,869 B1 * | 8/2003 | Eschelbeck et al. | 709/228 |
| 6,624,761 B2 | 9/2003 | Fallon | |
| 6,651,076 B1 | 11/2003 | Asano | |
| 6,665,086 B2 | 12/2003 | Hull et al. | |
| 6,678,705 B1 | 1/2004 | Berchtold et al. | |
| 6,681,380 B1 | 1/2004 | Britton et al. | |
| 6,691,139 B2 | 2/2004 | Ganesh et al. | |
| 6,697,835 B1 | 2/2004 | Hanson et al. | |
| 6,701,514 B1 | 3/2004 | Haswell et al. | |
| 6,711,594 B2 | 3/2004 | Yano et al. | |
| 6,714,219 B2 | 3/2004 | Lindhorst et al. | |
| 6,757,673 B2 | 6/2004 | Makus et al. | |
| 6,763,384 B1 | 7/2004 | Gupta et al. | |
| 6,880,010 B1 | 4/2005 | Webb et al. | |
| 6,910,064 B1 | 6/2005 | Astarabadi et al. | |
| 6,918,013 B2 | 7/2005 | Jacobs et al. | |
| 6,920,467 B1 | 7/2005 | Yoshimoto | |
| 6,925,470 B1 | 8/2005 | Sangudi et al. | |
| 6,934,934 B1 | 8/2005 | Osborne, II et al. | |
| 6,938,072 B2 | 8/2005 | Berman et al. | |
| 6,961,731 B2 | 11/2005 | Holbrook | |
| 7,010,757 B2 | 3/2006 | Stana et al. | |
| 7,043,496 B2 | 5/2006 | Yanagi | |
| 7,161,506 B2 | 1/2007 | Fallon | |
| 7,200,757 B1 | 4/2007 | Muralidhar et al. | |
| 7,266,705 B2 | 9/2007 | Peck et al. | |
| 7,275,066 B2 | 9/2007 | Priestley | |
| 7,400,274 B2 | 7/2008 | Fallon et al. | |
| 7,417,568 B2 | 8/2008 | Fallon et al. | |
| 7,606,788 B2 | 10/2009 | Samar | |
| 7,607,023 B2 | 10/2009 | Nakamura et al. | |
| 7,630,879 B2 | 12/2009 | Liu | |
| 8,082,349 B1 * | 12/2011 | Bhargava et al. | 709/227 |
| 8,327,335 B2 * | 12/2012 | Noble et al. | 717/127 |
| 2002/0007287 A1 | 1/2002 | Straube et al. | |
| 2002/0029228 A1 | 3/2002 | Rodriguez et al. | |
| 2002/0038226 A1 | 3/2002 | Tyus | |
| 2002/0038320 A1 | 3/2002 | Brook | |
| 2002/0049666 A1 | 4/2002 | Reuter et al. | |
| 2002/0065695 A1 | 5/2002 | Francoeur et al. | |
| 2002/0083034 A1 | 6/2002 | Orbanes et al. | |
| 2002/0091702 A1 | 7/2002 | Mullins | |
| 2002/0116205 A1 | 8/2002 | Ankireddipally et al. | |
| 2002/0124177 A1 | 9/2002 | Harper et al. | |
| 2002/0143774 A1 | 10/2002 | Vandersluis | |

(56) References Cited

U.S. PATENT DOCUMENTS

| | | | |
|---|---|---|---|
| 2002/0144101 A1 | 10/2002 | Wang et al. | |
| 2002/0178439 A1 | 11/2002 | Rich et al. | |
| 2002/0188712 A1* | 12/2002 | Caslin et al. | 709/223 |
| 2002/0188765 A1 | 12/2002 | Fong et al. | |
| 2003/0014421 A1 | 1/2003 | Jung | |
| 2003/0018666 A1 | 1/2003 | Chen et al. | |
| 2003/0027561 A1 | 2/2003 | Iyer | |
| 2003/0046313 A1 | 3/2003 | Leung et al. | |
| 2003/0050931 A1 | 3/2003 | Harman et al. | |
| 2003/0065644 A1 | 4/2003 | Horman et al. | |
| 2003/0069975 A1 | 4/2003 | Abjanic et al. | |
| 2003/0070003 A1* | 4/2003 | Chong et al. | 709/330 |
| 2003/0070158 A1 | 4/2003 | Lucas et al. | |
| 2003/0088593 A1 | 5/2003 | Stickler | |
| 2003/0120566 A1 | 6/2003 | Lipschutz et al. | |
| 2003/0121008 A1 | 6/2003 | Tischer | |
| 2003/0126151 A1 | 7/2003 | Jung | |
| 2003/0131007 A1 | 7/2003 | Schirmer et al. | |
| 2003/0140045 A1 | 7/2003 | Heninger et al. | |
| 2003/0140308 A1 | 7/2003 | Murthy et al. | |
| 2003/0145047 A1 | 7/2003 | Upton | |
| 2003/0163603 A1 | 8/2003 | Fry et al. | |
| 2003/0167266 A1 | 9/2003 | Saldanha et al. | |
| 2003/0167445 A1 | 9/2003 | Su et al. | |
| 2003/0177118 A1 | 9/2003 | Moon et al. | |
| 2003/0177341 A1 | 9/2003 | Devillers | |
| 2003/0191849 A1 | 10/2003 | Leong et al. | |
| 2003/0217033 A1 | 11/2003 | Sandler et al. | |
| 2003/0217083 A1 | 11/2003 | Taylor | |
| 2003/0218633 A1 | 11/2003 | Mikhail et al. | |
| 2003/0233278 A1* | 12/2003 | Marshall | 705/14 |
| 2004/0010699 A1 | 1/2004 | Shao et al. | |
| 2004/0060006 A1 | 3/2004 | Lindblad et al. | |
| 2004/0122872 A1 | 6/2004 | Pandya et al. | |
| 2004/0153972 A1 | 8/2004 | Jaepel et al. | |
| 2004/0243567 A1* | 12/2004 | Levy | 707/3 |
| 2005/0027658 A1 | 2/2005 | Moore et al. | |
| 2005/0060345 A1 | 3/2005 | Doddington | |
| 2005/0065964 A1 | 3/2005 | Ziemann et al. | |
| 2005/0065965 A1 | 3/2005 | Ziemann et al. | |
| 2005/0065987 A1 | 3/2005 | Telknowski et al. | |
| 2005/0132225 A1* | 6/2005 | Gearhart | 713/201 |
| 2006/0206941 A1* | 9/2006 | Collins | 726/25 |
| 2006/0236395 A1* | 10/2006 | Barker et al. | 726/23 |
| 2008/0010225 A1* | 1/2008 | Gonsalves et al. | 706/11 |
| 2009/0299784 A1 | 12/2009 | Guller et al. | |
| 2011/0231924 A1* | 9/2011 | Devdhar et al. | 726/11 |

OTHER PUBLICATIONS

A Generalized Search Tree for Database Systems, Jan. 19, 1996.
A Probabilistic Approach to fault Diagnosis in Linear Light waves Network, Department of Electrical Engineering, May 1992, pp. 1-122.
An Analysis of Several Software Defect Models IEEE Transactions on Software Engineering, vol. 14., No. 9 Sep. 1988.
Answers Corporation, definition of Schema, Synonyms from Answers.com, (www.answers.com/schema) and database schema—Information from Answers.com (www.answers.com/topic/database-schema-technology) (2008).
Beginning of 4.6 Software Evaluation, Tests and Measurements and RMF I/O Time Validation; Association of Computing Machinery, p. 519.
Chen, The Entity-Relationship Model—Toward a Unified View of Data, ACM Transactions on Database Systems, vol. 1, No. 1, pp. 9-36, Mar. 1976.
Computer Dictionary Online, Definition of Cache, retrieved from Computer-Dictionary-Online.org, 2 pages, 2007.
Dingle, Web Cache Coherence, Computer Networks and ISDN Systems, vol. 28, Issues 7-11, p. 907 (1999).
ERDraw An XML-based ER-diagram DraWing and Translation Tool.
Gauging Software Readiness with Defect Tracking IEEE May/Jun. 1997.
Genetic Algorithms for Optimal Logical Database Design Information and Software Technology, vol. 36, No. 12, p. 725-732, 1994.
Gryphon An Information Flow Based Approach to Message Brokering, International Symposium on software Reliability, Jun. 20, 2005.
Hacigumus et al., Executing SQL Over encrypted Data in the Database-Service-Provider Model, Jun. 4-6, 2002, ACM Sigmod, Madison, Wisconsin, pp. 216-227.
Hilbert, et al., An Approach to Large Scale Collection of Application Usage Data Over the Internet, Software Engineering 1998, Proceedings of the 1998 International Conference, Abstract, Apr. 1998.
Improving Index Performance through Pre-fetching School of Computer Science Carnegie Mellon University, Dec. 2000.
Kosaraju, S.R., Efficient Tree Pattern Matching, 30th Annual Symposium on Foundations of Computer Science, Oct. 30, 1989, pp. 178-183, ISBN-0-8186-1982-1.
Li et al., Scalable Web Caching of Frequently Updated Objects using Reliable Multicast, 12 pages (1999).
Li et al., Time-Based Language Models, CIKM '03, Nov. 3-8, 2003, New Orleans, Louisiana, USA, Copyright 2003 ACM; pp. 469-475.
Microsoft Press Computer Dictionary, Third Edtion, Definition of Cache, 1997.
Model for Worldwide Tracking of Distributed Objects, VRIJE Universiteit-Amsterdam.
Newton, Definition of 'server', Newtons Telecom Dictionary, 1999, pp. 702-703.
Programmer's Guide Monitor Client Library 12.5 Document ID 3286501-1250-01, Rev. (http://manual.sybase.com/onlinebooks/group-as /sg1250c/clilib/ . . . ) May 2001.
Quantitative Monitoring of Software Development by Time-Based and Intercheckpoint Monitoring, Software Engineering Journal, vol. 5, Issue 1, p. 43-49, Abstract, Jan. 1990.
Storing Semistructured Date with Stored pp. 431-442 (1999).
TAX A Tree Algebra for XML University of Michigan, Ann arbor, MI pp. 149-164 (2002).
Timber A native XML database the VLBD Journal (2002) pp. 274-291 Published Online Dec. 19, 2002.
Transactions in a Distributed Object Environment, Department of Electrical and Computer Engineering, Jun. 19, 2005.
Tree-Structured Indexes Module 2 Lectures 3 and 4.
Wang et al., A System for Approximate Tree Matching, IEEE Transactions on Knowledge and Data Engineering, vol. 6, No. 4, pp. 559-571, Aug. 1994.
White, How Computers Work, 4th Edition, Sep. 1998.
Zaki, Efficiently Mining Frequent Trees in a Forest, SIGKDD 2002 Edmonton, Alberta, Canada, Jul. 23-26, 2002.

* cited by examiner

Figure 1

| Source 210 |
|---|
| SI – JPMC Enterprise |
| SI(1) – JPMC Desktop Networks |
| SI(2) – JPMC Server LAN |
| SI(3) – JPMC DMZ |
| SE – External/Internet |

| Destination 220 |
|---|
| DI – JPMC Enterprise |
| DI(1) – JPMC Desktop Networks |
| DI(2) – JPMC Server LAN |
| DI(3) – JPMC DMZ |
| DE – External/Internet |
| DE(1) – Chase.com |

| Enrichment 230 |
|---|
| EI(1) – Internal Darknet |
| EI(2) – External Darknet |
| EI(3) – Online Banking Logs |
| EI(4) – Outgoing Proxy Logs |
| EI(5) – Firewall Logs |
| EI(6) – AV Infected Hosts |
| EI(7) – Phishing URLs |
| EE(1) – Phishing URLs |
| EE(2) – Botnet Drone List |
| EE(3) – Infection/C&C IP/URL |
| EE(4) – Mule & ATO feeds |

METHOD AND SYSTEM FOR IMPLEMENTING MULTI-LEVEL DATA FUSION

CROSS REFERENCE TO RELATED APPLICATIONS

This application claims priority to provisional application, U.S. patent application No. 61/418,020, filed Nov. 30, 2010, the contents of which are incorporated herein by reference in its entirety.

FIELD OF THE INVENTION

The present invention relates generally to data aggregation and analysis, and more specifically to a method and system for implementing multi-level data fusion based on comprehensive information from various structured and unstructured sources to provide useful tools for addressing security, fraud investigations and other concerns.

BACKGROUND OF THE INVENTION

Analysts working in information security, fraud investigations and related fields face several significant challenges in their efforts to collect, process and analyze data in order to produce timely, accurate and meaningful intelligence. Significant issues include an organization's capability to aggregate and correlate volumes of data in order to produce situational awareness and support data driven decision making.

Other drawbacks may also be present.

SUMMARY OF THE INVENTION

Accordingly, one aspect of the invention is to address one or more of the drawbacks set forth above. According to an embodiment of the present invention, an automated computer implemented method for implementing data fusion comprises the steps of aggregating data from a plurality of sources via one or more computer networks, wherein the data comprises at least unstructured data; extracting one or more features from the aggregated data; enriching the extracted data by compiling the data into one or more categories; generating one or more datasets based on the enriched data for identifying potentially fraudulent activity; and identifying one or more proposed actions to address the potentially fraudulent activity using a graphical interface.

According to an exemplary embodiment of the present invention, an automated computer implemented system for implementing data fusion comprises: a data aggregator for aggregating data from a plurality of sources via one or more computer networks, wherein the data comprises at least unstructured data; a feature extraction module for extracting one or more features from the aggregated data; a data enrichment module for enriching the extracted data by compiling the data into one or more categories; a dataset module for generating one or more datasets based on the enriched data for identifying potentially fraudulent activity; and a decision module for identifying one or more proposed actions to address the potentially fraudulent activity using a graphical interface.

According to an exemplary embodiment of the present invention, an automated computer implemented method and system implements data fusion wherein the plurality of sources comprises a combination of external sources including one or more of the following: external network telemetry, malware data, external mail lists, blogs, news and RSS feeds; wherein the plurality of sources comprises a combination of internal sources including one or more of the following: network telemetry, vulnerability assessment, asset inventory, video and move-money data; wherein the one or more features comprises one or more of information source, network, device, vulnerability, threats, exposure, actors, victims and targets; wherein the one or more categories comprises threat data, attack data, network data, vulnerability data, asset data, victim data and targeting detail; wherein the step of enriching further comprises identifying a burst activity; wherein the step of enriching further comprises identifying a dip activity; wherein the step of enriching further comprises intersecting source information, destination information and enrichment data; wherein the one or more proposed actions is displayed as a graphical representation; and wherein the one or more proposed actions comprises initiating an investigation.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Key capabilities of a multi-level fusion process of an embodiment of the present invention may include automation, artificial intelligence and the novel application of data collection and extraction mechanisms.

Multi-level fusion generally involves the combination of datasets to improve the performance of a system. Objectives may include identification, detection, and tracking. As applied to an embodiment of the present invention, multi-level fusion may include low, intermediate, and high level fusion. Low level or data fusion may include combining raw datasets. Intermediate or feature fusion may combine features from multiple raw datasets and/or temporal fusion of multiple samples from a single source. High level fusion is also known as decision fusion, which may combine inputs from multiple experts in the form of confidence ratings, ranking, decisions, etc.

An embodiment of the present invention may be a holistic, end-to-end solution based on discrete modules which may be added, removed, or upgraded over the lifecycle of the system. An embodiment of the present invention may use automation, artificial intelligence, and hardware and software to provide enhanced features and minimize human dependencies. Core system capabilities may include data aggregation and correlation to provide a fused dataset for situational awareness and decision support.

Figure 1:
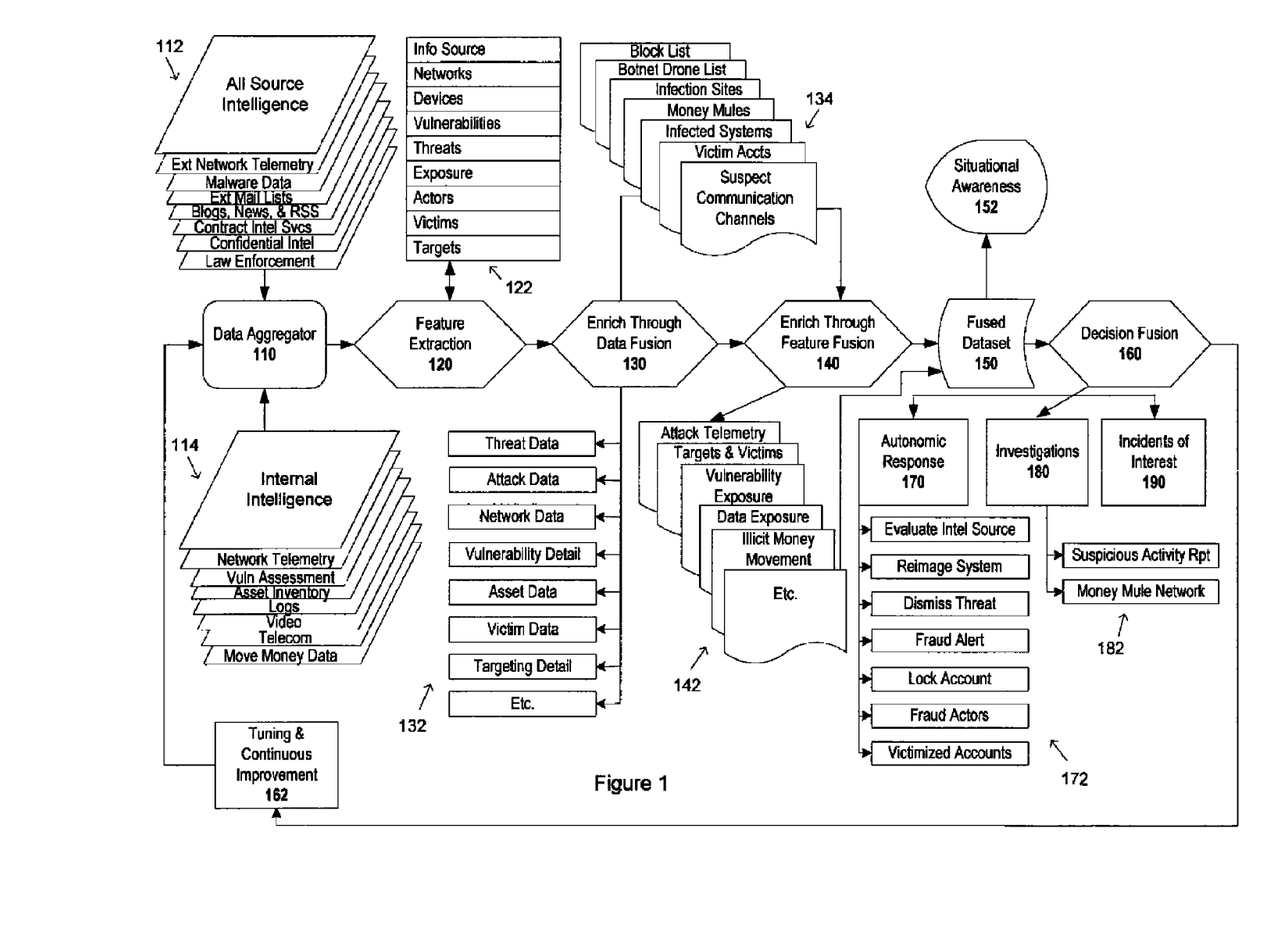
FIG. 1 is an exemplary flowchart illustrating a method for implementing multi-level data fusion, according to an embodiment of the present invention.

FIG. 1 illustrates an exemplary flowchart for implementing multi-level data fusion, according to an embodiment of the present invention. For example, various data sources may be identified, modeled and collections mechanism may be built. An exemplary approach may be dependant on the data type and source. However, as data complexity increases, the complexity of harvesting may also increase. At Data Aggregator step 110, data may be aggregated from various sources, as shown by 112, including external network telemetry, malware data, external mail lists, blogs, news, RSS feeds, contract intelligence services, confidential intelligence, law enforcement and/or other sources of intelligence and data. In addition, at Data Aggregator step 110, data may also be aggregated from internal intelligence, as shown by 114, such as network telemetry, vulnerability assessment, asset inventory, logs, video, telecom, move-money data and/or other sources of internal intelligence and data. At Data Aggregator step 110, data may be received from various sources and the relevant information may be identified. For example, at Data Aggregator step 110, an email may be received and the relevant information, such as attachments, body, subject, email header, sender, recipient and/or other information, may be extracted.

Data Aggregator step 110 may aggregate various types of data, including structured and unstructured data. Structured data may include information in a particular format, such as a table, database, etc. Unstructured data may refer generally to unformatted data, such as email content, conversations, news articles, RSS feeds, social networking content, chats and other types of prose material. Also, unstructured data may include data in different formats, including video, images, voice data, etc. For example, audio recordings from customer service centers, call centers, Fraud Hotlines, investigation interviews may be processed by an embodiment of the present invention. A transcript may be produced using speech-to-text software with the result pushed through a natural speech text processing stream enabling the fusion system to harvest key information. The audio recording itself may be analyzed for voice identification providing for the correlation of known and frequent callers. Additional features that may be extracted may include the call center identification and location, operator's identification, the number the call was made from, the number of the call center, conversation, result, action, etc.

Another example may involve video recordings from any source. Examples may include surveillance video from Automated Teller Machines (ATM), retail banking, building security, interviews, interrogations and other sources. These recordings may be processed for facial recognition, behavior analysis and activity identification. These features may be extracted, tagged and/or stored with additional features such as time, date, location and/or other information.

At Feature Extraction step 120, data may be extracted and classified into a useful format. For example, data may be classified by various categories, as shown by 122, such as information source, networks, devices, vulnerabilities, threats, exposure, actors, victims, targets and/or other features. Data passed from Feature Extraction step 120 to Data Enrichment step 130 may result in homogenous dataset, some of which may be illustrated as: Threat, Attack, Network, Vulnerability, Asset, etc.

At Data Enrichment step 130, the extracted data from Feature Extraction Module 120 may be compiled. As a result, Data Enrichment step 130 may generate outputs 134, including block list, Botnets, infection sites, suspect commercial channels, infected systems, victim accounts, money mules and/or other outputs. Data Enrichment step 130 may also involve storing data in an organized format, including threat data, attack data, network data, vulnerability data, asset data, victim data, targeting data and/or other categories, as represented by 132.

Data enrichment may be used to comprehend and analyze variances in volume, acceleration/deceleration, and velocity of activity. For example, data enrichment may be used to detect bursts or dips in activities. Bursts may include high volume activity within a short span of time. Dips may include low volume activity in a short span of time. By detecting sudden changes in activity from a source or an account, an embodiment of the present invention may assist in detecting, new behaviors, network attack, data theft, fraud and/or other event. For example, a certain level of activity may be expected from a single IP address from a normal user. However, if a particularly high number of transactions are occurring over a short span of time, an embodiment of the present invention may be alerted of such bursts in activity. This may indicate automation or machine driven activity when human interaction is expected. The change or anomalous behavior may be used to determine actions/reactions.

Feature Enrichment step 140 may accept data from Data Enrichment step 130 as an input to produce a series of actionable reports and other useful output. For example, actionable reports may include lists of websites to block an organization from viewing, lists of bank accounts which have been victimized, and money mules or participants in money laundering schemes. Other outputs 142 may include attack telemetry, targets and victims, vulnerability exposure, data exposure, illicit money movement and/or other outputs. Likewise, Feature Enrichment step 140 may result in a Fused Dataset 150 and actionable intelligence. A feature enriched report may include attacker, victim, and specific indicators of the attack or suspicious activity garnered from the disparate datasets.

For example, subscriber email lists may provide names and accounts of individuals receiving fraudulent deposits. This data may be used to derive various lists. For example, an exemplary list may identify potential account holders suspected of money laundering. Another exemplary list may include potential fraud victims. Correlation across lists may highlight ongoing movement of illicit funds and identify patterns or trends in money flow. These lists may be passed to fraud investigators for action.

According to another example, IP addresses harvested from subscription data feeds, email lists and other sources may identify IP addresses and URLs known or suspected to be involved in malicious activity, such as distribution of malware, data leakage and/or unauthorized activity. These details may be aggregated in a report (or other format) and sent to an appropriate team or other entity to take an appropriate action, such as block an organization's computer systems from accessing those sites or investigate systems that have visited those sites to identify infection and compromise.

Figure 2:
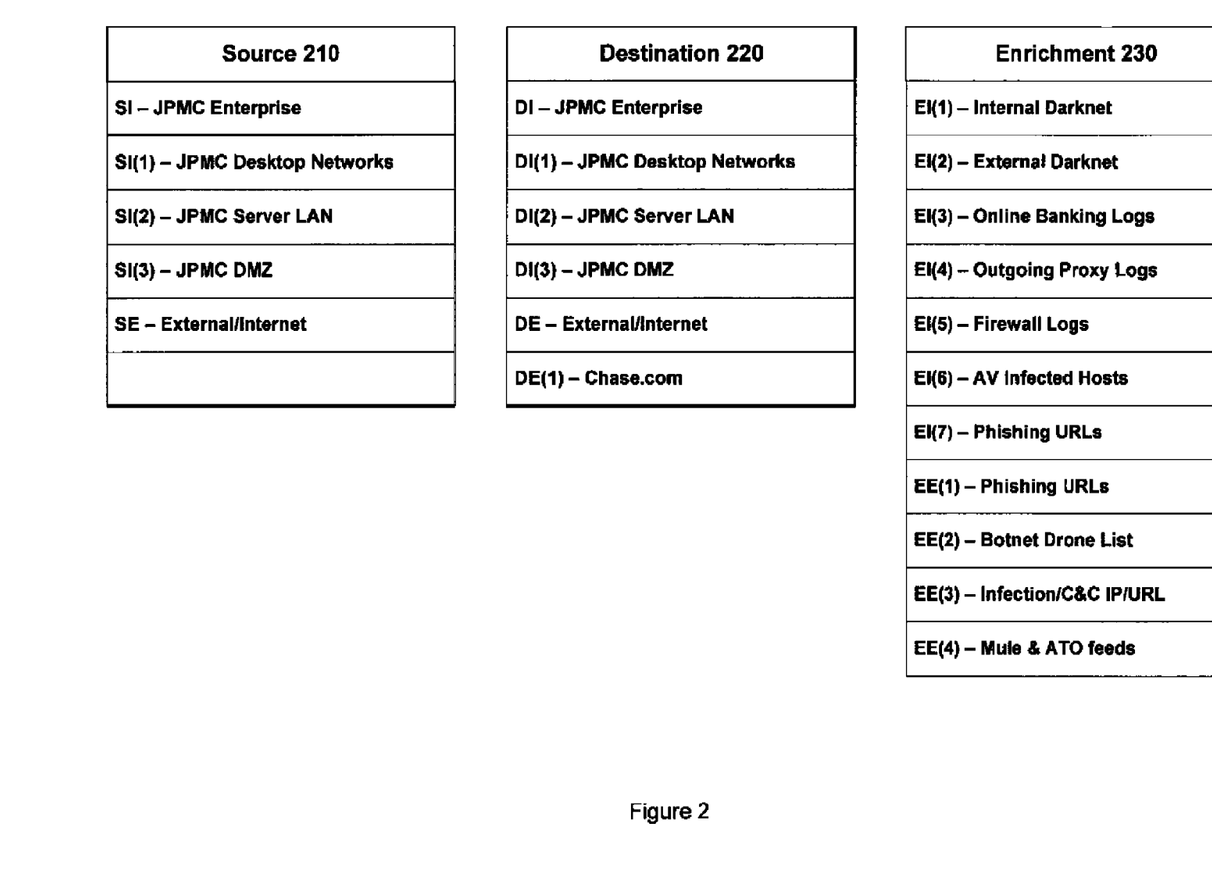
FIG. 2 is an exemplary illustration of data enrichment for multi-level data fusion, according to an embodiment of the present invention.

Another example of enrichment through feature fusion may include intersecting datasets. Additional insights may be gleaned by intersecting certain data sets, such as source information, destination information and/or enrichment data. FIG. 2 is an exemplary illustration of data enrichment for multi-level fusion, according to an embodiment of the present invention. Specifically, FIG. 2 is an exemplary illustration of intersecting datasets. Source information 210 may be in terms of traffic flow, where source is an initiating IP address. For example "SI" may indicate IP addresses internal to a company enterprise and "SE" may indicate IP addresses external to the company. Other examples may include SI(1) which indicates company desktop networks, SI(2) which indicates company server LAN and SI(3) which indicates company DMZ. Company DMZ may include a protected network segment which exposes a company's services to an un-trusted website or other source. Other sources may be identified and applied as well.

Destination information 220 may also be in terms of traffic flow, where destination is a terminating IP address. For example, "DI" may indicate IP addresses internal to a company enterprise and "DE" may indicate IP addresses external to a company. Other examples may include DI(1) which indicates company desktop networks, DI(2) which indicates company server LAN, DI(3) which indicates company DMZ and DE(1) which indicates company website. Other destinations may be identified and applied as well.

Enrichment 230 may include additional attributes which may be used to correlate traffic patterns to types of activity or threat classifications. Examples of enrichment datasets may include EI(1) which indicates internal darknet and EI(2) which indicates external darknet. Darknets may refer to machines or websites unreachable by other computers on the Internet. If a darknet is active, it is likely misconfigured or malicious. Other examples of enrichment datasets may include EI(3) which represents online logs, EI(4) which represents outgoing logs, EI(5) which represents firewall logs, EI(6) which represents antivirus (AV) infected hosts, EI(7) which represents phishing URLs, EE(1) which also represents phishing URLs, EE(2) which represents botnet drone lists, EE(3) which represents infection URLs and EE(4) which represents mule and account takeover (ATO) feeds. Other enrichment datasets may be identified and applied as well.

By intersecting various combinations of source information and destination information with enrichment data, an embodiment of the present invention may reveal certain datasets of interest. For example, the intersection of internal assets S1(1) initiating communication with internal servers D1(2) may represent expected internal LAN/WAN traffic. According to another example, the intersection of any internal asset SE (SI) initiating communication with external/internal systems (DE) where the traffic is logged by a Darknet Sensor (EI(1)) may include traffic not configured to use company web proxies and thereby represent mis-configured or infected assets. According to another example, the intersection of external/Internet systems (SE) initiating communication with company website web servers DE(1) may represent systems visiting the company website. The intersection of company website visitors (SE and DE(1)) with retail online banking logs (EI(3)) may represent likely company online banking customers. The intersection of company online banking customers (SE and DE(1) and EI(3)) with internally logged phishing URLs may represent customers redirected from a phishing site to company website and are likely phishing victims. The intersection of company online banking customers (SE and DE(1) and EI(3)) with externally tracked infected, botnet systems (EE(2)) may represent likely compromised accounts.

Analysis at Fused Dataset step 150 by community detection algorithms may identify a set of computers infected with a piece of malware. Further analysis may identify an additional set of computers with similar characteristics but are not yet infected. The organization incident handlers may understand which systems need to be cleaned and which ones need to be remediated before the infection spreads further.

Decision Fusion step 160 may apply a series of artificial intelligence algorithms to the Fused Data from Fused Dataset step 150. Initially, the results may be categorized as issues requiring investigations, information security incidents of interest, and autonomic responses. In addition, the process may be adjusted to facilitate additional categories. In addition to supporting Decision Fusion 160, Fused Dataset 150 may be leveraged by other programs to produce situational awareness, as shown by 152. This may be delivered in the form of audio or visual queues, charts, graphs, and other formats. Situational awareness may be displayed via a graphical user interface or sent to a recipient as a report or other format.

Decision Fusion step 160 may generate an Autonomic Response 170, Investigation 180, Incidents of Interest 190 and/or other output. Examples of Autonomic Responses, as shown by 172, may include evaluate intelligence source, reimage system, dismiss threat, issue fraud alert, lock account, identify and/or contact fraud actors, identify and/or contact victimized accounts, etc. Examples of investigations, as shown by 182, may include issuing a suspicious activity report and identifying money mule and/or other network. In addition, a feedback from Decision Fusion step 160 to Data Aggregator step 110 may provide tuning and continuous improvement via 162, which may occur via adaptive algorithms.

For example, an expert system program may analyze the fused data to identify potential exposure of Personally Identifiable Information (PII). The system may use specific criteria to evaluate antivirus scanning results, network flows and proxy logs. The system may identify a host that has had several malware infections and has been sending uncharacteristically large volumes of data out of the firm. The destination IP addresses may be listed as a Botnet Command and Control Server. The system may programmatically initiate a scan of the target host for PII, open a case and notify an investigator.

Figure 3:
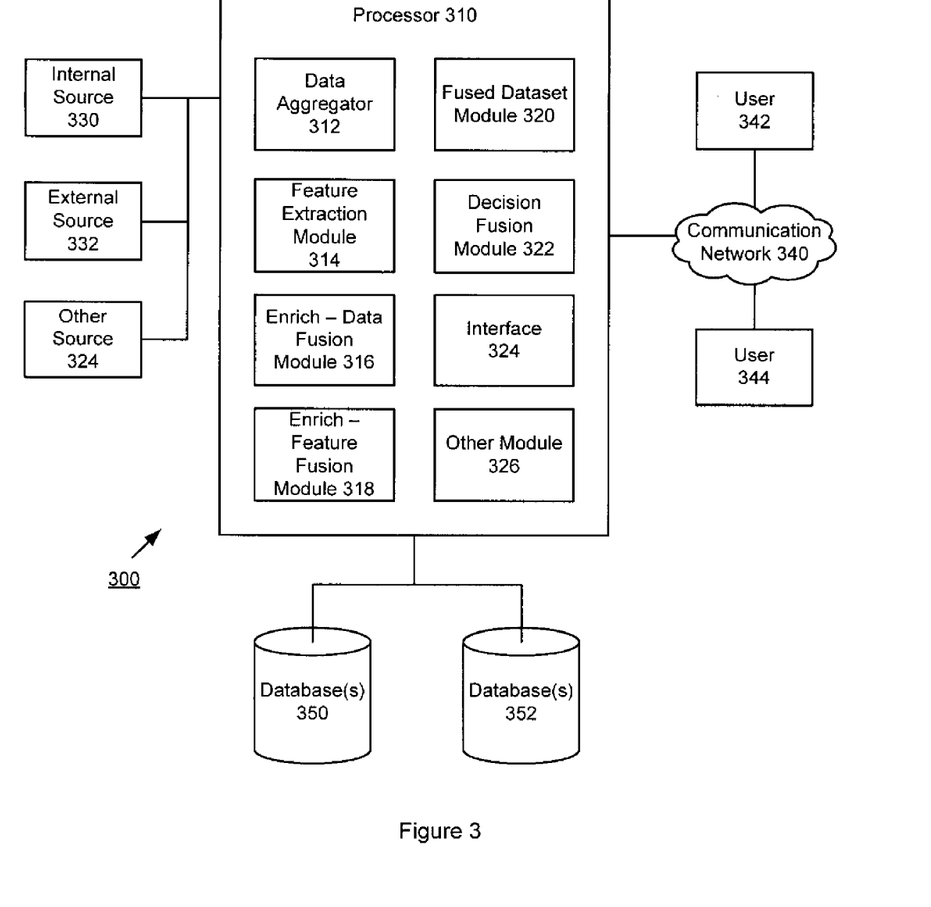
FIG. 3 is an exemplary diagram of a system for providing multi-level data fusion, according to an embodiment of the present invention.

FIG. 3 is an exemplary diagram of a system 300 for implementing multi-level data fusion, according to an embodiment of the present invention. For example, Processor 310 may include various modules and interfaces for analyzing data and identifying fraudulent and potentially fraudulent events, according to an embodiment of the present invention. Processor 310 may include Data Aggregator 312, Feature Extraction Module 314, Enrich-Data Fusion Module 316, Enrich-Feature Fusion Module 318, Fused Dataset Module 320, Decision Fusion Module 322, Interface 324 and/or other modules, interfaces and/or processors, as represented by Other Module 326. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Data Aggregator 312 may aggregate data from various sources, such as internal source 330, external source 332 and/or other sources represented by 324. The data may include structured and unstructured data. Certain data may then be extracted from the aggregated data and further classified in a useful format by Feature Extraction Module 314. The extracted feature data may then be compiled into categories and further used to generate actionable reports at Enrich-Data Fusion Module 316. The resulting data may then be enriched by further aggregating the data by similar/like features at Enrich-Feature Fusion Module 318. Fused Datasets Module 320 may then output the resulting data. An algorithm may be applied by Decision Fusion Module 322 to identify appropriate actions, such as autonomic responses, investigations, identification of incidents of interest and/or other actions.

For example, System 110 may access and/or maintain Database 350 and/or other database 352. While a single database is illustrated in the exemplary figure, the system may include multiple databases at the same location or separated through multiple locations. The databases may be further combined and/or separated. In addition, the databases may be supported by Processor 310 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms. Various users 342, 344 may access Processor 310 through Communication Network 340.

An exemplary use case may involve identification of a skimming suspect. For example, there may be a scenario where multiple instances of debit card skimmers are found at retail bank branches in a specific geography. As surveillance video is processed by an embodiment of the present invention, entities may be identified by the correlation of their appearance, facial recognition from ATM cameras and the debit card used to access the bank vestibule or ATM. Comparisons may be made with other images matching in appearance and correlated to the use of the specific debit card. Anomalies may be detected which may enable the system to distinguish the legitimate owner of the debit card from the suspect. Analysis of additional video may determine other ATMs which potentially have skimmers. An embodiment of the present invention may then open a case with the pertinent detail including a picture of the suspect from the ATM camera, a list of impacted ATMs and/or other relevant information.

Another exemplary use case may involve reimaging of an infected desktop. An embodiment of the present invention may receive a message from an email list identifying several Zeus malware domains and/or other types of crime ware and viruses. Analysis of network flows and proxy logs may indicate that every time the user accesses his bank account, the computer sends a small amount of data to the suspect domains. An embodiment of the present invention may spawn a PII scan which returns a negative result. In response, an embodiment of the present invention may open an IT request to reinstall the operating system on the suspect system.

Another exemplary use case may involve detection of a money mule network. According to this example, an analyst may be notified by an intelligence source of an IP address used by a known money mule handler. The analyst may input the IP address into a system of an embodiment of the present invention. The system's evaluation of the IP address against online banking logs may identify several accounts which may been accessed from that IP address and a single device token, such as a smartphone, laptop, personal computer, mobile device, etc. Further analysis using the identified device token may identify additional accounts accessed using the same device token but from different IP addresses. An embodiment of the present invention may apply a community detection algorithm seeded with the known IP addresses and device token. The results may include a voluminous list of accounts with fraudulent deposits and withdrawals. Enriching the output by filtering against known benign activity may reduce errors and improve accuracy. In response, an embodiment of the present invention may place the identified accounts on Fraud Alert Status, open a case containing the pertinent data and notify an investigator.

Another exemplary use case may involve credit cards. According to this example, an embodiment of the present invention may receive a list of compromised credit card numbers from various intelligence sources. Analysis of card data may reveal which accounts are valid and open. The system of an embodiment of the present invention may place the card on Fraud Alert and escalate to a cards investigation team. The system of an embodiment of the present invention may notify money movement organizations, such as Western Union and Moneygram, who may place the cards on a fraud watch list.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 310 may be stored and cataloged in Databases 350, 352 which may comprise or interface with a searchable database. Databases 350, 352 may comprise, include or interface to a relational database. Other databases, such as a query format database, a Standard Query Language (SQL) format database, a storage area network (SAN), or another similar data storage device, query format, platform or resource may be used. Databases 350, 352 may comprise a single database or a collection of databases, dedicated or otherwise. In one embodiment, Databases 350, 352 may store or cooperate with other databases to store the various data and information described herein. In some embodiments, Databases 350, 352 may comprise a file management system, program or application for storing and maintaining data and information used or generated by the various features and functions of the systems and methods described herein. In some embodiments, Databases 350, 352 may store, maintain and permit access to customer information, transaction information, account information, and general information used to process transactions as described herein. In some embodiments, Databases 350, 352 is connected directly to Processor 310, which, in some embodiments, it is accessible through a network, such as communication network, for example.

Communication Network 340 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communication Network 340 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications Network 340 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, Communication Network 340 may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network 120 may comprise a Personal Branch Exchange (PBX), which may further connect to the PSTN.

In some embodiments, Processor 310 may include any terminal (e.g., a typical home or personal computer system, telephone, personal digital assistant (PDA) or other like device) whereby a user may interact with a network, such as communications network that is responsible for transmitting and delivering data and information used by the various systems and methods described herein. Processor 310 may include, for instance, a personal or laptop computer, a telephone, or PDA. Processor 310 may include a microprocessor, a microcontroller or other general or special purpose device operating under programmed control. Processor 310 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor 310 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 310 may also include a network-enabled appliance, a browser-equipped or other network-enabled cellular telephone, or another TCP/IP client or other device.

As described above, FIG. 3 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented method for implementing data fusion, the method comprising the steps of:
   aggregating data from a plurality of sources via one or more computer networks, wherein the data comprises at least unstructured data wherein the unstructured data comprises video, images and voice data;
   extracting one or more features from the aggregated data;
   enriching the extracted data by compiling the data into one or more categories to identify one or more variances in volume, acceleration, deceleration and velocity of activity; wherein the step of enriching the extracted data further comprises the step of aggregating the enriched extracted data by similar features and generating an actionable report in response;
   generating one or more datasets based on the enriched data for identifying potentially fraudulent activity; and
   automatically identifying one or more proposed actions, based at least in part on the actionable report, to address the potentially fraudulent activity using a graphical interface; wherein the one or more proposed actions are identified from a group comprising at least an autonomic response, investigation and incident of interest.

2. The method of claim 1, wherein the plurality of sources comprises a combination of external sources including one or more of the following: external network telemetry, malware data, external mail lists, blogs, news and RSS feeds.

3. The method of claim 1, wherein the plurality of sources comprises a combination of internal sources including one or more of the following: network telemetry, vulnerability assessment, asset inventory, video and move-money data.

4. The method of claim 1, wherein the one or more features comprises one or more of information source, network, device, vulnerability, threats, exposure, actors, victims and targets.

5. The method of claim 1, wherein the one or more categories comprises threat data, attack data, network data, vulnerability data, asset data, victim data and targeting detail.

6. The method of claim 1, wherein the step of enriching further comprises identifying a burst activity.

7. The method of claim 1, wherein the step of enriching further comprises identifying a dip activity.

8. The method of claim 1, wherein the one or more proposed actions is displayed as a graphical representation.

9. The method of claim 1, wherein the one or more proposed actions comprises initiating an investigation.

10. A computer implemented system for implementing data fusion, the system comprising:
    a processor; and
    a memory comprising computer-readable instructions which when executed by the processor cause the processor to perform the steps comprising:
    aggregating data from a plurality of sources via one or more computer networks, wherein the data comprises at least unstructured data wherein the unstructured data comprises video, images and voice data;
    extracting one or more features from the aggregated data;
    enriching the extracted data by compiling the data into one or more categories to identify one or more variances in volume, acceleration, deceleration and velocity of activity; wherein the step of enriching the extracted data further comprises the step of aggregating the enriched extracted data by similar features and generating an actionable report in response;
    generating one or more datasets based on the enriched data for identifying potentially fraudulent activity; and
    automatically identifying one or more proposed actions, based at least in part on the actionable report, to address the potentially fraudulent activity using a graphical interface; wherein the one or more proposed actions are identified from a group comprising at least an autonomic response, investigation and incident of interest.

11. The system of claim 10, wherein the plurality of sources comprises a combination of external sources including one or more of the following: external network telemetry, malware data, external mail lists, blogs, news and RSS feeds.

12. The system of claim 10, wherein the plurality of sources comprises a combination of internal sources including one or more of the following: network telemetry, vulnerability assessment, asset inventory, video and move-money data.

13. The system of claim 10, wherein the one or more features comprises one or more of information source, network, device, vulnerability, threats, exposure, actors, victims and targets.

14. The system of claim 10, wherein the one or more categories comprises threat data, attack data, network data, vulnerability data, asset data, victim data and targeting detail.

15. The system of claim 10, wherein the data enrichment module identifies a burst activity.

16. The system of claim 10, wherein the data enrichment module identifies a dip activity.

17. The system of claim 10, wherein the one or more proposed actions is displayed as a graphical representation.

18. The system of claim 10, wherein the one or more proposed actions comprises initiating an investigation.

\* \* \* \* \*